(12) United States Patent
Hu et al.

(10) Patent No.: US 11,367,054 B2
(45) Date of Patent: Jun. 21, 2022

(54) BIOLOGICAL RECOGNITION TECHNOLOGY-BASED MOBILE PAYMENT DEVICE, METHOD AND APPARATUS, AND STORAGE MEDIUM

(71) Applicant: Xiaomi Inc., Beijing (CN)

(72) Inventors: Yang Hu, Beijing (CN); Yuanyuan Huang, Beijing (CN)

(73) Assignee: Xiaomi Inc., Beijing (CN)

( * ) Notice: Subject to any disclaimer, the term of this patent is extended or adjusted under 35 U.S.C. 154(b) by 1221 days.

(21) Appl. No.: 15/206,945

(22) Filed: Jul. 11, 2016

(65) Prior Publication Data
US 2017/0148017 A1    May 25, 2017

(30) Foreign Application Priority Data

Nov. 23, 2015   (CN) ......................... 201510821881.8
Nov. 27, 2015   (CN) ......................... 201510848445.X

(51) Int. Cl.
*G06Q 20/02*        (2012.01)
*G06Q 20/40*        (2012.01)
(Continued)

(52) U.S. Cl.
CPC ............. *G06Q 20/02* (2013.01); *G06F 21/32* (2013.01); *G06Q 20/08* (2013.01);
(Continued)

(58) Field of Classification Search
CPC .. G06Q 20/3829; G06Q 20/02; G06Q 20/102; G06Q 20/3226; G06Q 20/40;
(Continued)

(56) References Cited

U.S. PATENT DOCUMENTS 5,870,723 A * 2/1999 Pare, Jr. ........... G06Q 20/40145
705/39
10,083,444 B1 * 9/2018 Schneider ........ G06Q 20/40145
(Continued)

FOREIGN PATENT DOCUMENTS

CN        101986641 A    3/2011
CN        102542449 A    7/2012
(Continued)

OTHER PUBLICATIONS

"Local Authentication with Bluetooth enabled Mobile Devices"; F. Dellutri • G. Me • M.A. Strangio; Joint International Conference on Autonomic and Autonomous Systems and International Conference on Networking and Services - (icas-isns'05) (p. 72); (Year: 2005).*

(Continued)

*Primary Examiner* — John W Hayes
*Assistant Examiner* — Edgar R Martinez-Hernandez
(74) *Attorney, Agent, or Firm* — Oblon, McClelland, Maier & Neustadt, L.L.P.

(57) ABSTRACT

The present disclosure is related to a biological recognition technology-based mobile payment device, method and apparatus, and a storage medium. The method includes receiving, by a payment Trusted Application (TA) that operates in a Trusted Execution Environment (TEE) on a device, a call request from one of a plurality of third party payment applications that are installed on the device and operate with the payment TA, determining content to be encrypted and an encryption parameter for performing encryption based on the call request, acquiring a result of biometric recognition from a biometric recognition application, encrypting the content according to the encryption parameter and the result of biometric recognition and returning the encrypted content to the third party payment application that generates the call
(Continued)

request, for the third party payment application to perform a pay tent-related operation based on the encrypted content.

8 Claims, 5 Drawing Sheets

(51) Int. Cl.
| | | |
|---|---|---|
| H04W 12/041 | (2021.01) | |
| H04W 12/043 | (2021.01) | |
| G06Q 20/32 | (2012.01) | |
| G06Q 20/08 | (2012.01) | |
| H04W 12/04 | (2021.01) | |
| G06F 21/32 | (2013.01) | |
| G06Q 20/10 | (2012.01) | |
| G06Q 20/38 | (2012.01) | |
| H04W 12/06 | (2021.01) | |
| H04W 88/02 | (2009.01) | |
| H04L 9/40 | (2022.01) | |

(52) U.S. Cl.
CPC ....... *G06Q 20/0855* (2013.01); *G06Q 20/102* (2013.01); *G06Q 20/32* (2013.01); *G06Q 20/322* (2013.01); *G06Q 20/326* (2020.05); *G06Q 20/3226* (2013.01); *G06Q 20/3829* (2013.01); *G06Q 20/40* (2013.01); *G06Q 20/40145* (2013.01); *H04L 63/0428* (2013.01); *H04W 12/04* (2013.01); *H04W 12/041* (2021.01); *H04W 12/043* (2021.01); *H04W 12/06* (2013.01); *H04W 88/02* (2013.01); *G06Q 2220/00* (2013.01)

(58) Field of Classification Search
CPC .... G06Q 20/08; G06Q 20/0855; G06Q 20/32; G06Q 20/322; G06Q 20/326; G06Q 20/40145; G06Q 2220/00; G06F 21/32; H04L 63/0428; H04W 12/04; H04W 12/06; H04W 88/02; H04W 12/041; H04W 12/043
USPC .......................................................... 705/71
See application file for complete search history.

(56) References Cited

U.S. PATENT DOCUMENTS

| | | | | |
|---|---|---|---|---|
| 2001/0000535 A1* | 4/2001 | Lapsley | ............... | G06Q 20/102 705/64 |
| 2003/0163739 A1* | 8/2003 | Armington | ............. | G06F 21/32 726/3 |
| 2004/0182921 A1* | 9/2004 | Dickson | ................ | G07F 7/1008 235/380 |
| 2004/0199469 A1* | 10/2004 | Barillova | ............... | G06Q 20/40 705/44 |
| 2008/0091944 A1* | 4/2008 | von Mueller | ........ | G06Q 20/085 713/168 |
| 2012/0130903 A1* | 5/2012 | Dorsey | ................ | G06Q 20/322 705/71 |
| 2013/0226800 A1* | 8/2013 | Patel | .................. | G06Q 20/3224 705/44 |
| 2013/0262317 A1* | 10/2013 | Collinge | ............ | G06Q 20/3823 705/71 |
| 2014/0052532 A1 | 2/2014 | Tsai et al. | | |
| 2014/0052620 A1 | 2/2014 | Rogers et al. | | |
| 2014/0052637 A1* | 2/2014 | Jooste | ..................... | G06Q 20/32 705/44 |
| 2014/0096182 A1 | 4/2014 | Smith | | |
| 2014/0283006 A1* | 9/2014 | Korkishko | .............. | G06F 21/44 726/16 |
| 2014/0289833 A1* | 9/2014 | Briceno | ................. | H04L 63/08 726/7 |
| 2014/0317686 A1 | 10/2014 | Vetillard | | |
| 2015/0032627 A1* | 1/2015 | Dill | ....................... | G06Q 20/385 705/44 |
| 2015/0046339 A1* | 2/2015 | Wong | ................. | G06Q 20/3829 705/71 |
| 2015/0088756 A1* | 3/2015 | Makhotin | .............. | G06Q 20/32 705/71 |
| 2015/0120557 A1 | 4/2015 | Zhang | | |
| 2015/0244718 A1* | 8/2015 | Smets | ..................... | G06F 21/74 726/7 |
| 2015/0327072 A1* | 11/2015 | Powell | ............. | G06Q 20/38215 455/411 |
| 2015/0348018 A1* | 12/2015 | Campos | ................. | G06Q 20/12 705/41 |
| 2015/0348026 A1* | 12/2015 | Roberts | .............. | G06Q 20/3227 705/71 |
| 2016/0092878 A1* | 3/2016 | Radu | ..................... | G06Q 20/36 705/72 |
| 2016/0241402 A1* | 8/2016 | Gordon | ............... | H04W 12/069 |
| 2017/0017957 A1* | 1/2017 | Radu | ................. | G06Q 20/3821 |
| 2017/0046679 A1* | 2/2017 | Gotlieb | ............ | G06K 19/06206 |
| 2017/0061441 A1* | 3/2017 | Kamal | ........... | G06Q 20/40145 |
| 2017/0068953 A1* | 3/2017 | Kim | ........................ | G06Q 20/10 |
| 2017/0109742 A1* | 4/2017 | Varadarajan | ....... | G06Q 20/3829 |
| 2017/0148029 A1 | 5/2017 | Hu et al. | | |
| 2017/0270511 A1* | 9/2017 | Lindeman | .............. | G06Q 20/32 |
| 2017/0364903 A1* | 12/2017 | Lopez | ..................... | G06F 9/455 |
| 2017/0372540 A1* | 12/2017 | Shirai | ........................ | H04L 9/32 |
| 2018/0025442 A1* | 1/2018 | Isaacson | ................. | G06F 3/048 705/26.62 |
| 2019/0356641 A1* | 11/2019 | Isaacson | .............. | G06Q 20/384 |
| 2021/0182863 A1* | 6/2021 | Doraiswamy | ......... | H04L 9/3226 |

FOREIGN PATENT DOCUMENTS

| | | |
|---|---|---|
| CN | 202854880 U | 4/2013 |
| CN | 103745155 A | 4/2014 |
| CN | 103942880 A | 7/2014 |
| CN | 104574058 A | 4/2015 |
| CN | 104636122 A | 5/2015 |
| CN | 104700268 A | 6/2015 |
| CN | 104813349 A | 7/2015 |
| CN | 104899741 A | 9/2015 |
| CN | 105306490 A | 2/2016 |
| EP | 2 746 981 A1 | 6/2014 |
| EP | 2 759 955 A1 | 7/2014 |
| KR | 10-2014-0029990 A | 3/2014 |
| KR | 10-2014-0114263 A | 9/2014 |
| RU | 2 538 330 C2 | 1/2015 |
| WO | WO 2010/033970 A1 | 3/2010 |

OTHER PUBLICATIONS

"A Biometric based Secure Mobile Payment Framework"; Shaik Shakeel Ahamad • V. N. Sastry • Madhusoodhnan Nair; 2013 4th International Conference on Computerand Communication Technology (ICCCT) (pp. 239-246); (Year: 2013).*

Combined Office Action and Search Report dated Feb. 22, 2019 in Chinese Patent Application No. 201510848445.X, 7 pages (with English translation of categories of cited reference).

Combined of International Search Report and Written Opinion dated Apr. 11, 2016 in PCT/CN20015/099616 (with English translation of Categories of Cited Documents).

Extended Search Report dated Dec. 13, 2016 in European Patent Application No. 16182576.5.

Office Action dated Jul. 12, 2017 in Korean Patent Application No. 10-2016-7008497.

Office Action dated Jan. 23, 2018 in Japanese Patent Application No. 2016-519951.

Combine Russian Federation Office Action and Search Report dated Nov. 1, 2017 in Patent Application No. 2016136708/08(057625) (with English translation of categories of cited documents ), 10 pages.

(56) References Cited

OTHER PUBLICATIONS

International Preliminary Report on Patentability and Written Opinion dated May 29, 2018 in PCT/CN2015/099616 (with English translation), 9 pages.

* cited by examiner

BIOLOGICAL RECOGNITION TECHNOLOGY-BASED MOBILE PAYMENT DEVICE, METHOD AND APPARATUS, AND STORAGE MEDIUM

This application claims priority of the Chinese Patent Application No. 201510821881.8, filed on Nov. 23, 2015, and the Chinese Patent Application No. 201510848445.X, filed on Nov. 27, 2015, which are incorporated herein by reference in their entirety.

TECHNICAL FIELD

The present disclosure is related to the field of mobile payment technologies, and more particularly, to a biological recognition technology-based mobile payment device, method and apparatus, and a storage medium.

BACKGROUND

Mobile payment is an online payment mode developed and popularized in recent years. Traditional mobile payment modes require users to input multi-digit payment passwords to finish a payment procedure. To simplify users' operations, a biological recognition technology-based mobile payment mode is developed, such as fingerprint payment. In this mode, the payment procedure is finished by collecting, recognizing and verifying a user's biological information, followed by determining that verification of the user's biological information is successful, so that the user does not need to input the payment password.

As capital transactions are involved, mobile payment has stricter requirements on payment environment security. Currently, TrustZone technologies provided by a British company ARM (Advanced RISC Machines) can offer reliable solutions for mobile payment security. According to the standards of TrustZone technologies, mobile terminals are classified into Rich Execution Environments (REE) and Trusted Execution Environments (TEE). REE is a common and non-confidential execution environment, in which operating systems of mobile terminals opera while TEE is a secure and confidential execution environment. REE includes Client Applications (CAs), and Trusted Applications (TAs) operate in the TEE. Different from CAs in the REF, the TEE provides a series of security services for TAs, including the completeness of execution by applications, secure storage, secure interaction with input and output devices, key management, encryption algorithms, secure communication with CA in the REE and the like. Take fingerprint payment as an example. A fingerprint recognition application includes CA and TA, wherein the TA of fingerprint recognition application is used to collect, recognize and verify fingerprint information, and provide the fingerprint information verification result to the CA of the fingerprint recognition application. If a third party payment application directly acquires the verification result from the CA of the fingerprint recognition application, as the CA of the fingerprint recognition application operates in an REE, the verification result acquired by the third party payment application is incredible. Therefore, the third party payment applicant also includes CA and TA, wherein the TA of the third party payment application directly acquires credible verification result from the TA of the fingerprint recognition application, and provides the same to the CA of the third party payment application, so that authenticity and reliability of the acquired verification result is ensured.

In actual application, a user may need to stall and operate multiple third party payment applications in one mobile terminal. For example, one mobile terminal simultaneously supports two third party payment applications including Alipay application and a Wechat application. Currently, TAs of third party payment applications are installed in mobile terminals using the following two manners: a. before the mobile terminals leave the, factory, TAs of third party payment applications are pre-installed in the TEE of the mobile terminals: and b. of third party payment application are developed and signed of the form of Service Provider SP TAs, and are downloaded into the TEE of the mobile terminals afterwards. However, no matter which installation manner is used, if one mobile terminal needs to simultaneously support multiple third party payment applications, the following problems will arise:

first, since only TA is digitally signed, can the TA pass its identity verification by the Trusted Operating System (OS) of the TEE and normally operate in the TEE; however, performing digital signatures for TAs needs payment of certain fees to companies providing TrustZone technologies, so multiple items of signature fees need to be paid for a mobile terminal simultaneously supporting multiple third party payment applications, and the cost is increased;

second, since the TEE stores important confidential information such as contact information, International Mobile Equipment Identity (IMEI) and the like, which is visible to the TAs opening in the TEE, if a malicious third party payment application as installed in the mobile terminal, the important confidential information stored in the TEE may be willfully read, so the TEE has a high security risk.

SUMMARY

Aspects of the disclosure provide a method for performing biometrics based payment. The method includes receiving, by a payment Trusted Application (TA) that operates in a Trusted Execution Environment (TEE) on a device, a call request from one of a plurality of third party payment applications that are installed on the device and operate with the payment TA, determining content to be encrypted and an encryption parameter for performing encryption based on the call request, acquiring a result of biometric recognition from a biometric recognition application, encrypting the content according to the encryption parameter and the result of biometric recognition and returning the encrypted content to the, third party payment application that generates the call request, for the third party payment application to perform a payment-related operation based on the encrypted content.

Further, in an example, the method includes detecting whether an application key corresponding to the third party payment application exists in the payment PA at a time to activate the third party payment application for a biometric recognition based payment function, determining a first key generation algorithm, a first data encryption algorithm, a second key generation algorithm and a second data encryption algorithm based on the call request when no application key corresponding to the third party payment application exists in the payment TA, generating the application key for the third party payment application using the first key generation algorithm, encrypting the application key using the first data encryption algorithm and a device key of the device, generating a user key corresponding to a user account using the second key generation algorithm, encrypting the user key using the second data encryption algorithm and the application key and returning the encrypted application key and the encrypted user key to the third party payment application for the third party payment application to provide the encrypted application key and the encrypted user key to a sever.

In another example, the method includes detecting whether an application key corresponding to the third party payment application exists in the payment PA at a time to activate the third party payment application for a biometric recognition based payment function, determining a key generation algorithm and a data encryption algorithm based on the call request when the application key corresponding to the third party payment application exists in the payment TA, generating a user key corresponding to a user account using the key generation algorithm, encrypting the user key using the data encryption algorithm and the application key and returning the encrypted user key to the third party payment application for the third party payment application to provide the encrypted user key to a server.

To encrypt the content according to the encryption parameter and the result of biometric recognition, the method includes detecting whether the result of biometric recognition indicates a success of biometric verification when the third party payment application performs a payment operation for a user account, encrypting the content using the encryption parameter and a user key corresponding to the user account to obtain an encryption result and returning the encryption result to the third party payment application for the third party payment application to provide the encryption result to a server.

According to an aspect of the disclosure, the biometric recognition application receives the call request from the third, party payment application, collects, recognizes and verifies biometrics to obtain the result of biometric recognition, and sends the result of biometric recognition to the third party payment application; and when the result of biometric recognition indicates that verification of biometrics is successful, the third party payment application sends the call request to the payment TA.

In an example, the third party payment application is a Client Application (CA) operating in a Rich Execution Environment (REE) in the device.

Aspects of the disclosure provide an apparatus that includes a processor and a memory storing instructions executable by the processor to execute, a payment Trusted Application (TA) operating in a Trusted Execution Environment (TEE) to serve a plurality of third party payment applications and to execute a biometric recognition application The processor is configured to receive, by the payment TA, a call request from one of the third party payment applications, determine content to be encrypted and an encryption parameter for performing encryption based on the call request, acquire a result of biometric recognition from the biometric recognition application, encrypt the content according to the encryption parameter and the result of biometric recognition and return the encrypted content to the third. party payment application that generates the call request, for the third party payment application to perform a payment-related operation based on the encrypted content.

In an example, the processor is farther configured to detect whether an application key corresponding to the third party payment application exists in the payment PA at a time to activate the third party payment application for a biometric recognition based payment function, determine a first key generation algorithm, a first data encryption algorithm, a second key generation algorithm and a second data encryption algorithm based on the call request when no application key corresponding to the third party payment application exists in the payment TA, generate the application key for the third party payment application using the first key generation algorithm, encrypt the application key using the first data encryption algorithm and a device key of the apparatus, generate a user key corresponding to a user account using the second key generation algorithm, encrypt the user key using the second data encryption algorithm and the application key and return the encrypted application key and the encrypted user key to the third pay payment application for the third party payment application to provide the encrypted application key and the encrypted user key to a server.

In another example, the processor is configured to detect whether an application key corresponding to the third party payment application exists in the payment PA at a time to activate the third party payment application for a biometric recognition based payment function, determine a key generation algorithm and a data encryption algorithm based on the call request when the application key corresponding to the third party payment application exists in the payment TA, generate a user key corresponding to a user account using the key generation algorithm, encrypt the user key using the data encryption algorithm and the application key and return the encrypted user key to the third party payment application for the third party payment application to provide the encrypted user key to a server.

According to an aspect of the disclosure, the processor is configured to detect whether the result of biometric recognition indicates a success of biometric verification when the third party payment application performs a payment operation for a user account, encrypt the content using the encryption parameter and a user key corresponding to the user account to obtain an encryption result and return the encryption result to the third party payment application for the third party payment application to provide the encryption result to a server.

In an example, the processor is configured to perform the biometric recognition application to receive the call request from the third party payment application, collect, recognize and verify biometrics to obtain the, result of biometric recognition, and send the result of biometric recognition to the third party payment application; and when the result of biometric recognition indicates that verification of biometrics is successful, the third party payment application sends the call request to the payment TA.

Aspects of the disclosure provide a non-transitory computer-readable storage medium having stored therein instructions that, when executed by a processor of a mobile terminal device, causes the mobile terminal device to perform operations for biometric recognition based payment. The operations include receiving, by a payment Trusted Application (TA) that operates in a Trusted Execution Environment (TEE) on the mobile terminal device to serve a plurality of third party payment applications installed on the mobile terminal device, a call request from one of the third party payment applications, determining content to be encrypted and an encryption parameter for performing encryption based on the call request, acquiring a result of biometric recognition from a biometric recognition application, encrypting the content according to the encryption parameter and the result of biometric recognition and returning the encrypted content to the third party payment application that generates the call request, for the third party payment application to perform a payment-related operation based on the encrypted content.

It should be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
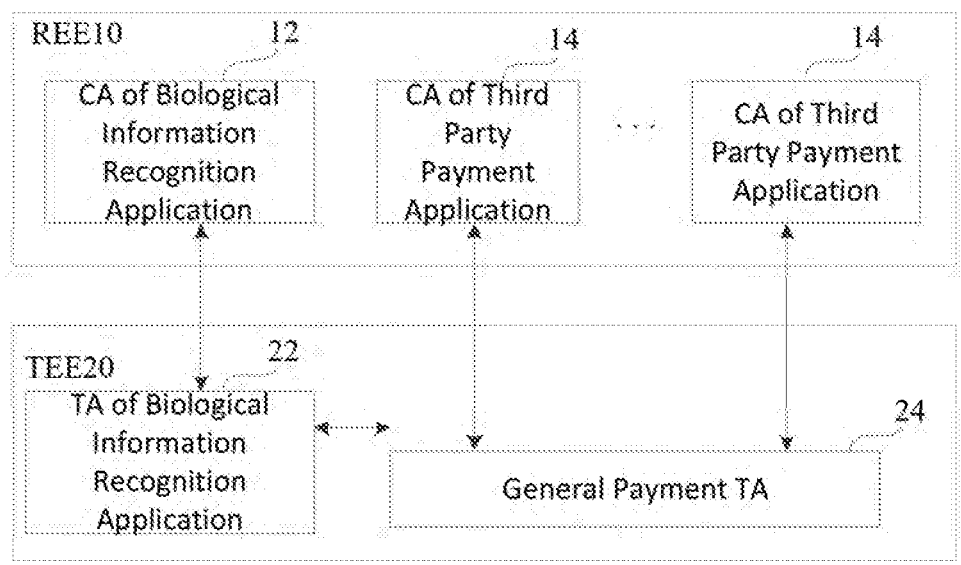
FIG. 1 is a block view showing a biological recognition technology-based mobile payment device according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise presented. The embodiments set forth the following description of exemplary embodiments do not represent all embodiments consistent with the invention. Instead, they are merely examples of apparatuses and methods consistent with aspects related to the invention as recited in the appended claims.

The mobile payment device involved in this disclosure may be a cell phone, a tablet computer, a mobile Personal Computer (PC), a Personal Digital Assistant (PDA) or other mobile terminal devices. The mobile payment deice is provided with a sensor for collecting biological information, and has a biological recognition (biometric recognition) technology-based payment function. The biological information includes but is not limited to one or more of fingerprints, irises, retinas, genes, voices, human faces, palm geometry, veins, gaits, handwriting. For example, the mobile payment device is provided with a fingerprint sensor and has a fingerprint payment function.

According to an exemplary embodiment of the present disclosure, there is provided a biological recognition technology-based mobile payment device, comprising: a biological information recognition application and a general payment Trusted Application (TA) operating in a Trusted Execution Environment (TEE), wherein;

the general payment TA is configured to: be called by multiple third party payment applications; receive a call request from the third party payment application; based on the call request, determine target content to be encrypted and an encryption parameter for performing encryption; acquire a biological information recognition result from the biological information recognition application; encrypt the target content according to the encryption parameter and the biological information recognition result; and return an encryption result to the third party payment application, so that the third party payment application performs a payment-related operation based on the encryption result.

By installing and operating a general payment TA that can be called by multiple third party payment applications in a TEE, the following problems in the related arts are solved: when a mobile terminal needs to support multiple third party payment applications, as multiple corresponding TAs need to be installed in the TEE, the cost is increased, and the TEE has a high security risk; and the following effects are achieved: as multiple third party payment applications share one general payment TA, it is unnecessary to install multiple TAs in the TEE, so that the, signature fee is reduced and thus the cost is reduced; a mobile terminal is effectively prevented from being installed with a TA of a malicious third party payment application, so that the security risks of the TEE are reduced.

Optionally, the general payment TA is also configured to: when the third party payment application activates a biological recognition technology-based payment function, if the general payment TA has not stored an application key corresponding to the third party payment application, generate the application key corresponding to the third party payment application using a first key generation algorithm, and encrypt the application key using a first data encryption algorithm and a device key;

the general payment TA is also configured to: generate a user key corresponding to a target user account using a second key generation algorithm, and encrypt the user key using a second data encryption algorithm and the application key, wherein the general payment TA returns the encrypted application key and user key to the third party payment application so as to provide the same to a background server via the third party payment application, the encryption parameter comprises the first key generation algorithm, the first data encryption algorithm, the second key generation algorithm and the second data encryption, algorithm, and is indicated by the call request when the third party payment application calls the general payment TA.

Optionally, the general payment TA is also configured to: when the third party payment application activates a biological recognition technology-based payment function, if the general payment TA has stored an application key corresponding to the third party payment application, generate a user key corresponding to a target user account using a second key generation algorithm, and encrypt the user key using a second data encryption algorithm and the application key, wherein the general payment TA returns the encrypted user key to the third party payment application so as to provide the same to a background server via the third party payment application, the encryption parameter comprises the second key generation algorithm and the second data encryption algorithm, and is indicated by the call request when the third party payment application calls the general payment TA.

Through the above mode, during the activation stage of the biological recognition technology-based payment function, the general payment TA generates a user key corresponding to a target user account, and provides the same to a background server, so thin. the background server can verify the validity of the user's identity using the user key in the followed payment stage, thereby ensuring the transaction security.

Optionally, the general payment TA is also configured to: when the third party payment application performs a payment operation regarding a target user account, if the biological information recognition result indicates that verification of biological information as successful, encrypt the target content us mg the encryption parameter and a user key corresponding to the target user account to obtain an encryption result, wherein the general payment TA returns the encryption result to the party payment application so as to provide the same to a background server via the third party payment application.

Through the above mode, during the payment stage of the target user account, the general payment TA encrypts the target content to be verified by the background server using the user key corresponding to the target user account, and feeds the encryption result back to the background server, so that the background server can verify the validity of he user's identity based on the decryption result, thereby ensuring the security.

Optionally, after the biological information recognition application receives the call request from the third party payment application, the biological information recognition result is acquired by collecting, recognizing and verifying the biological information, and is sent by the biological information recognition application to the third party payment application; and the third party payment application is configured to, when the biological information recognition result acquired from the biological information recognition application indicates that verification of the information is successful, send the call request to the general payment TA.

Through the above mode, to third party payment application first analyses the biological information recognition result, and calls the general payment TA to perform a payment-related operation when verification of the biological information is successful, so that wasteful calling is avoided, thereby ensuring the reasonableness and standardization of the calling procedure.

Optionally, the general patent TA comprises an algorithm management module, a key management module, a data encrypt module, a result acquisition module and a key storage module, wherein:

the algorithm management module is configured to manage a biological recognition technology-based algorithm used by the third party payment application, wherein the algorithm comprises at least one key generation algorithm and at least one data encryption algorithm, the key management module is configured to generate a key required for performing the payment-related operation by using the key generation algorithm;

the data encryption module is configured to encrypt the target content to be encrypted by using the data encryption algorithm;

the result acquisition module is configured to acquire the biological information recognition result from the biological information recognition application;

the key storage module is configured to store the key generated by the key management module.

Through the above mode, the function realization of the general payment TA is more general, so that the general payment TA can support multiple third party payment applications frequently used by the user, Optionally, the third party payment application is a Client Application (CA) operating in a Rich Execution Environment (REE).

FIG. 1 is a block view showing a biological recognition technology-based mobile payment device according to an exemplary embodiment. As shown in FIG. 1, the mobile payment device comprises a REE10 and a TEE20.

A CA12 of a biological information recognition application operates in the REE10.

A general payment TA24 and a TA22 of the biological information recognition application operate in the TEE20.

The general payment TA24 be called by CA14 of multiple third party payment applications. In the embodiments disclosure, if the mobile payment device needs to support multiple third party payment applications simultaneously, only the CA14 of the multiple third party payment applications need to be installed and operated in a mobile terminal deice, the CA14 of the multiple third party payment applications sharing one general payment TA24.

After the CA12 of the biological information recognition application is called the CA14 of the third party payment application, the TA22 of the biological information recognition application is called. The TA22 of the biological recognition application is used to collect, recognize and verify biological information. After the general payment TA24 is called by the CA14 of the third party payment application the general payment TA24 determines target content to be encrypted and an encryption parameter for performing encryption based on the call request, acquires biological information recognition result from the TA22 of the biological information recognition application; encrypts the target content according to the encryption parameter and the biological information recognition result; and returns an encryption result to the CA14 of the third party payment application, so that the CA14 of the third party payment application performs a payment-related operation based on the encryption result.

To sum up, with the mobile payment device provided by this embodiment, by installing and operating a general payment TA that can be called by multiple third party payment applications in a TEE, the following problems in the related arts are solved: when a mobile terminal needs to support multiple third party payment applications, as multiple corresponding TAs need to be installed in the TEE, the cost is increased, and the TEE has a high security risk; and the following effects are achieved; as multiple third party payment applications share one general payment TA, it is unnecessary to install multiple TAs in the TEE, so that the signature fee is reduced and thus the coast is reduced; and a mobile terminal is effectively prevented from being installed with a TA of a malicious third party payment application, so that the security risks of the TEE are reduced.

Figure 2:
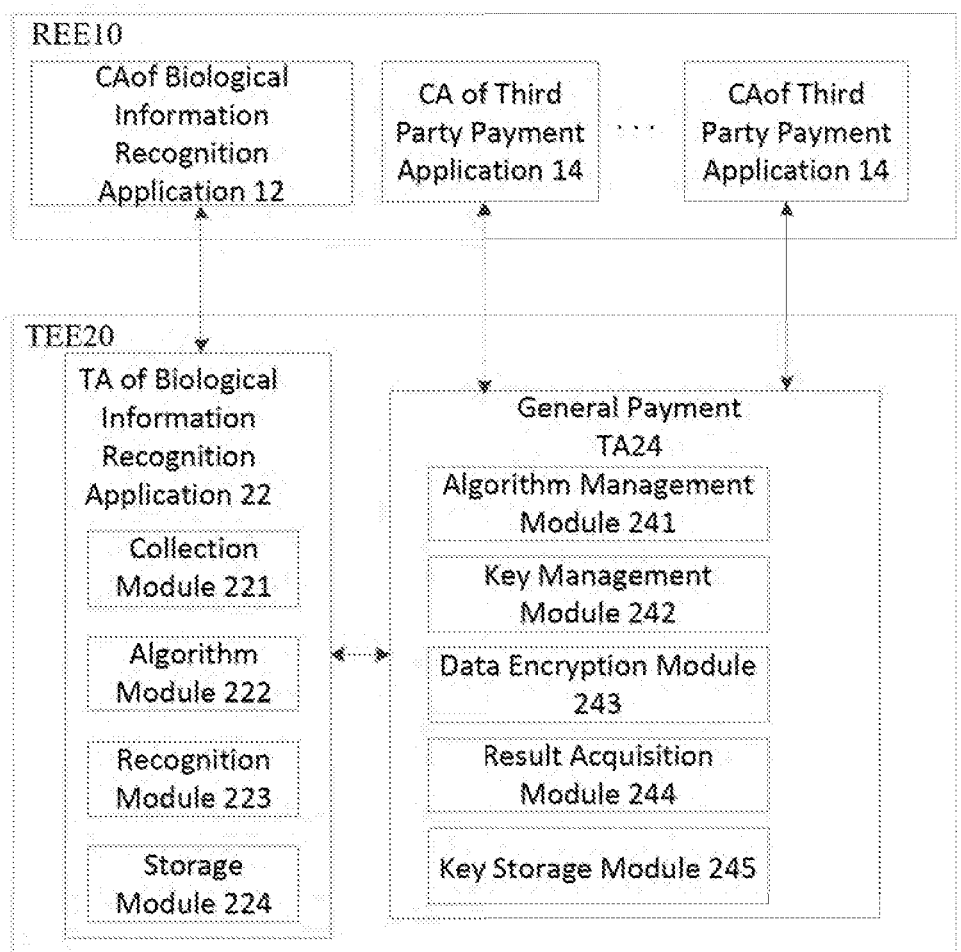
FIG. 2 is a block view showing a biological recognition technology-based mobile payment device according to another exemplary embodiment.

FIG. 2 is a block view showing a biological recognition technology-based mobile payment device according to another exemplary embodiment. As shown in FIG. 2, the mobile payment device comprises a REE10 and a TEE20.

A CA12 of a biological information recognition application operates in the REE10.

A general payment TA24 and a TA22 of the biological information recognition application operate in the TEE20.

The general payment TA24 may be called by CA14 of multiple third party payment applications.

After the CA12 of the biological information recognition application is called by the CA14 of the third party payment application, TA22 of the biological information recognition application called. The TA22 of the biological information recognition application is used to collect, recognize and verify biological information. After the general payment TA24 is called by the CA14 of the third party payment application, the general payment TA24 determines target content to be encrypted and an encryption parameter for performing encryption based on the call request, acquires a biological information recognition result from the TA2 of the biological information recognition application encrypts the target content according to the encryption parameter and the biological information recognition result; and returns an encryption result to the CA14 of the third party payment application, so that the CA14 of the third party payment application performs a payment-related operation based on the encryption result.

In this embodiment, shown in FIG. 2, the general payment comprises an algorithm management module 241, a key management module 242, a data encryption module 243, a result acquisition module 244 and a key storage module 245.

The algorithm management module 241 manage a biological recognition technology-based algorithm used by the third party payment application. The algorithm comprise at least one key generation algorithm and at least one data encryption algorithm. The key generation algorithm refers to an algorithm for generating a key required for performing the payment-related operation. In this embodiment, the key generation algorithm is used to generate an application key corresponding to the third party payment application and a user key corresponding to a user account for logging on the third party payment application. The data encryption algorithm refers to an algorithm for encrypting the target content, in, the payment procedure, the target content may include content determined through negotiation between the CA14 of the third party payment application and the background server, such as an order number. In the activation procedure (i.e in the procedure of activating a biological recognition technology-based payment function), the target content may include the generated application key or the user key. Considering that in this embodiment, the general payment TA24 is shared by the CA14 of the multiple third party payment applications, and different third party payment applications may have different requirements on the key generation algorithm and the data encryption algorithm, even when the same third party payment application generates different keys or encrypts different content, different key generation algorithms or different data encryption algorithms may be used. Therefore, the algorithm management module 241 manages at least one key generation algorithm and at least one data encryption algorithm. For example, several common key generation algorithms and several common data encryption algorithms are configured. in the algorithm management module 241. In addition, the data encryption algorithm may be a digital signature algorithm.

Optionally, the above algorithm further includes at least one data hash algorithm. The data hash algorithm refers to an algorithm used for extracting a hash value of the target content to be encrypted. When the data encryption algorithm is used, the extracted hash value is encrypted. Based on the same reason, as the general payment TA24 is shared by the CA14 of the multiple third party payment applications, the algorithm management module 241 manages at least one data hash algorithm. For example, several common data hash algorithms are configured in the algorithm management module 241.

The key management module 242 is configured to generate a key required for performing the payment-related operation by using the key generation algorithm. The key generation algorithm used here is indicated by a parameter in a call request when the CA14 of the third party payment application calls the general payment TA24.

The data encryption module 243 is configured to encrypt the target content to be encrypted by using the data encryption algorithm. The data encryption algorithm used here is indicated by a parameter in a call request when the CA14 of the third party payment application calls the general payment TA24. Optionally, if the data encryption algorithm is a digital signature algorithm, the data encryption module 243 is configured to perform digital signature to the target content using the digital signature algorithm.

The result acquisition module 244 is configured to acquire the biological information recognition result from the TA22 of the biological information recognition application. In the embodiments of this disclosure, the biological information recognition application is used to recognize one or more of the following biological information: fingerprints, irises, retinas, genes, voices, human faces, palm geometry; veins, gaits, handwriting. With reference to FIG. 2, the TA22 of the biological information recognition application comprises a collection module 221, an algorithm module 222, a recognition module 223 and a storage module 224. The collection module 221 is configured to acquire the original data of the biological information collected by a sensor. Take fingerprints as an example, when the fingerprint sensor is a camera, the collection module 221 is configured to acquire fingerprint images collected by the camera. The algorithm module 222 is configured to convert the original data of the biological information into digital data. By doing so, on one hand, storage space occupied by the biological information can be effectively reduced; on the other hand, since the original data of the biological information that is directed stored has a risk of being copied, after convening the original data of the biological information into digital data, security of the biological information is improved. The recognition module 223 is configured to match and verify the currently collected biological information with pre-stored biological information to obtain a recognition result. The storage module 224 is configured to store the recognition result and the biological information.

The key storage module 245 is configured to store the key generated by the key management module 242. In this embodiment, the key storage module 245 is configured to store the application key and the user key Optionally, the key management module 242 is also configured to process the key using a security protection algorithm, and store the processed key in the key storage module 245. The security protection algorithm refers to an algorithm used for protecting the security of a key, including but not limited to a data encryption algorithm, a data separating and assembling algorithm and the like.

The followings describe the system provided by the present embodiment from an activation procedure (i.e., the procedure of activating a biological recognition technology-based payment function) and a payment procedure.

1. The activation procedure (take a target user account of the third party payment application as an example)

A CA14 of a third party payment application is used to call a general payment TA24 to request the general payment TA24 to generate a user key corresponding to a target user account.

If an application key corresponding to the third party payment application has not been stored in the key storage module 245, the general payment TA24 is used to generate the application key corresponding to the third party payment application using a first key generation algorithm; the data encryption module 243 encrypts the application key using a first data encryption algorithm and a device key; the general payment TA24 returns the encrypted application key to the CA14 of the third party payment application so as to provide the same to a background server. The general payment TA24 is also used to generate a user key corresponding to the target user account using a second key generation algorithm; the data encryption module 243 encrypts the user key using a second data encryption algorithm and the application key; the general payment TA24 returns the encrypted user key to the CA14 of the third party payment application so as to provide the same to the background server. The first key generation algorithm, the first data encryption algorithm, the second key generation algorithm and the second data encryption algorithm used here are indicated by a call request when the CA14 of the third party payment application calls the general payment TA24.

If an application key corresponding to the third party payment application has been stored in the key storage module 245, the general payment TA24 is used to generate a user key corresponding to the target user account using a second key generation algorithm; the data encryption module 243 encrypts the user key using a second data encryption algorithm and the application key; the general payment TA24 returns the encrypted user key to the CA14 of the third party payment application so as to provide the same to the background server. The second key generation algorithm and the second data encryption algorithm used here are indicated by a call request when the CA14 of the third party payment application calls the general payment TA24.

Optionally, one or more of the device key, the application key and the user key is/are (an) asymmetrical key(s).

2. The payment procedure (take a target user account of the third party payment application as an example)

A CA14 of a third party payment application is used to call a CA12 of a biological information recognition application, and request the CA12 of the biological information recognition application to call TA22 of the biological information recognition application to collect, recognize and verify biological information.

The CA14 of the third party payment application so used to negotiate with a background server target content to be verified in the payment procedure. After the CA12 of the biological information recognition application acquires biological information recognition result, the general payment TA24 is called and request encrypt the target content.

The general payment TA24 is used to acquire the biological information recognition result from the TA22 of the biological information recognition application via the result acquisition module 244. After the biological information recognition result indicates that verification of the biological information is successful, the data encryption module 243 encrypts the target content using a designated data encryption algorithm and a user key corresponding to the target user account to obtain an encryption result.

The CA14 of the third party payment application is also used to acquire the encryption result from the general payment TA24, and send the same to a background server. The background server is used to decrypt the encryption result using the user key corresponding to the target user account to obtain a decryption result, and finish the payment procedure if the decryption content is consistent with the target content.

To sum up, with the mobile payment device provided by this embodiment, by installing and operating a general payment IA that can he called by multiple third party payment applications in a TEE, the following problems in the related arts are solved; when a mobile terminal needs to support multiple third party payment applications, as multiple corresponding TAs need to be installed in the TEE, the cost is increased, and the TEE has a high security risk; and the following effects are achieved: as multiple third party payment applications share one general payment TA, it is unnecessary to install multiple TAs in the TEE, so that the signature fee is reduced and thus the cost is reduced: a mobile terminal is effectively prevented from being installed with a TA of a malicious third party payment application, so that the security risks of the TEE are reduced, In addition, considering that different third party payment applications may have different requirements on the key generation algorithm and the data encryption algorithm, by configuring several common algorithms in the general payment TA in advance, the general payment TA can support different third party payment applications frequently used by the user. In addition, since the algorithms stored in the general payment TA can be updated when the devices are updated afterwards, the general payment TA is able to be compatible with more third party payment applications.

Figure 3:
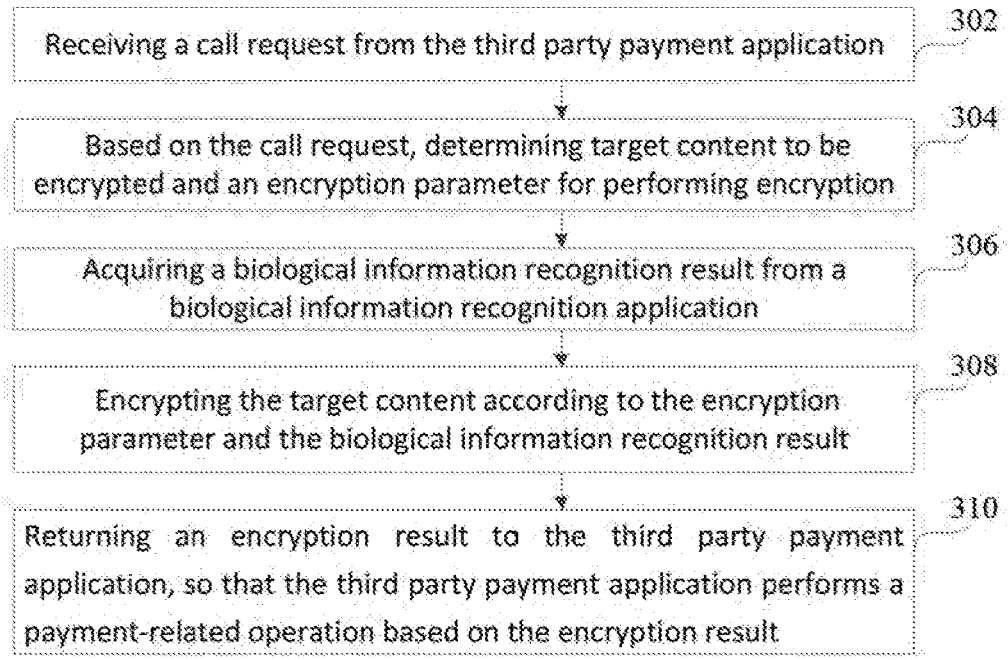
FIG. 3 is a flow chart showing a biological recognition technology-based mobile payment method according to an exemplary embodiment.

It should be noted that, when the general payment TA realizes its functions in the above embodiments, examples are described based on the division of the respective functional modules; however, in actual application, the above functions may be realized by different functional modules according to the actual needs to realize all or part of the above described functions, FIG. 3 is a flow chart showing a biological recognition technology-based mobile payment method according to an exemplary embodiment. The method may be applied to the general payment TA operating in the mobile payment device provided by the embodiment Shown in FIG. 1 or 2. The method may comprise;

Step 302: receiving a call request from the third party payment application;

Step 304: based on the call request, determining target content to be encrypted and an encryption parameter for performing encryption;

Step 306: acquiring a biological information recognition result from a biological information recognition application;

Step 308: encrypting the target content according to the encryption parameter and the biological information recognition result; and Step 310: returning an encryption result to the third party payment application, so that the third party payment application performs a payment-related operation based on the encryption result.

To sum up, with the mobile payment method provided by this embodiment, by installing and operating a general payment TA that can be called by multiple third party payment applications in a TEE, the following problems in the related arts are solved: when a mobile terminal needs to support multiple third, party payment applications, as multiple corresponding TAs need to be installed in the TEE, the cost is increased, and the TEE has a high security risk; and the following effects are achieved: as multiple third party payment applications share one general payment TA, it is unnecessary to install multiple TA in the TEE, so that the signature fee is reduced and thus the cost is reduced; a mobile terminal is effectively prevented from being installed with a TA of a malicious third party payment application, so that the security risks of the TEE are reduced, Optionally, when the third party payment application activates a biological recognition technology-based payment function, the method further comprises:

if the general payment TA has not stored an application key corresponding to the third party payment application, generating the application key of the third party payment application using a first key generation algorithm, and encrypting the application key using a first data encryption algorithm and a device key;

generating a user key corresponding to a target user account using a second key generation algorithm, and encrypting the user key using a second data encryption algorithm and the application key;

returning the encrypted application key and user key to the third party payment application so as to provide the same to a background server via the third party payment application, wherein the encryption parameter comprises the first key generation algorithm, the first data encryption algorithm, the second key generation algorithm and the second data encryption algorithm, and is indicated by the call request when the third party payment application calls the general payment TA.

Optionally, when the third party payment application activates a biological recognition technology-based payment function, the method further comprises;

if the general ;payment TA has stored an application key corresponding to the third party payment application, generating a user key corresponding to a target user account using a second key generation algorithm, and encrypting the user key using a second data encryption algorithm and the application key, returning the encrypted user key to the third party payment application so as to provide the same to a background server via the third party payment application, wherein the encryption parameter comprises the second key generation algorithm and the second data encryption algorithm, and is indicated by the call request when the third party payment application calls the general payment TA.

Optionally, when the third party payment application performs a payment operation regarding a target user account, encrypting the target content according, to the encryption parameter and the biological information recognition result comprises;

if the biological information recognition result indicates that verification of biological information is successful, encrypting the content using encryption parameter and a user key corresponding to the target user account to obtain an encryption result, and returning the encryption result to the third party payment application so as to provide the same to a background server via the third party payment application.

Optionally, after the biological information recognition application receives the call request from the third party payment application, the biological information recognition result is acquired by collecting recognizing and verifying the biological information, and is sent by the biological information recognition application to the third party payment application; and when the biological information recognition result acquired from the biological information recognition application indicates that verification of the biological information is successful, the third party payment application sends the call request to the general payment TA.

Optionally, the third party payment application is a Client Application (CA) operating in a Rich Execution Environment REE.

Figure 4:
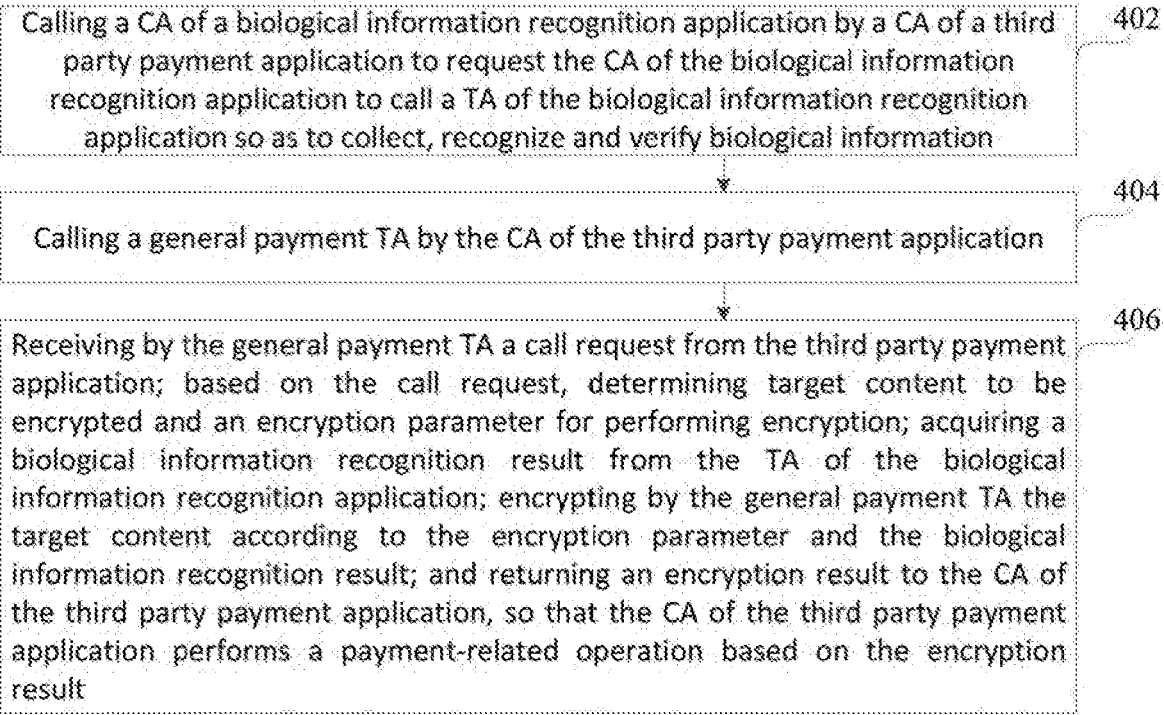
FIG. 4 is a flow chart showing biological recognition technology-based mobile payment method according to another exemplary embodiment.

FIG. 4 is a flow chart showing a biological recognition technology-based mobile payment method according to another exemplary embodiment. The method may comprise:

Step 402: calling a CA of a biological information recognition application by a CA of a third party payment application to request the CA of the biological information recognition application to call a TA of the biological information recognition application so as to collect recognize and verify biological information;

Step 404: calling a general payment TA by the CA of the third party payment application;

Step 406: receiving by the general payment TA a call request from the third party payment application; based on the call request, determining by the general payment TA target content to be encrypted and an encrypted and an encryption parameter for performing encryption: acquiring by the general payment TA a biological information recognition result from the TA of the biological information recognition application; encrypting by the general payment TA the target content according to the encryption parameter and the biological inform recognition result; and returning by the general payment TA an encryption result to the CA the third party payment application, so that the CA of the third party payment application performs a payment-related operation based on the encryption result.

To sum up, with the mobile payment method provided by this embodiment, by installing and operating a general payment TA that can be called by CAs of multiple third party payment applications in a TEE, the following problems in the related arts are solved: when a mobile terminal needs to support multiple third party payment applications, a multiple corresponding TAs need to be installed in the TEE, the cost is increased, and the TEE has a high security risk; and the effects achieved: as the CAs of the multiple third party payment applications share one general payment TA, it is unnecessary to install multiple TAs in the TEE, so that the signature fee is reduced and thus the cost is reduced; a mobile terminal is effectively prevented from being installed with a TA of a malicious third party payment application, so that the security risks of the TEE are reduced.

Figure 5:
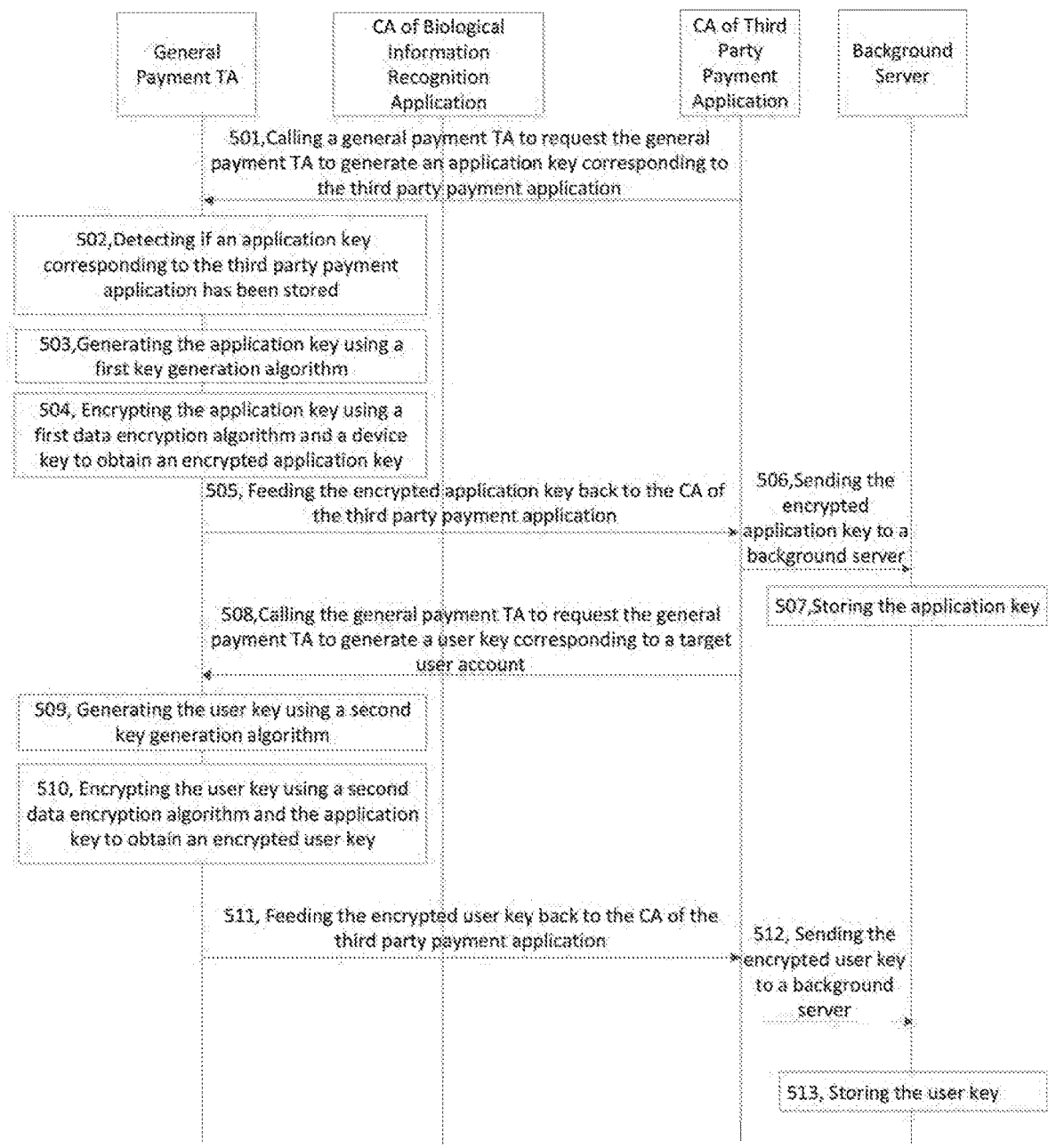
FIG. 5 is a flow chart showing a biological recognition technology-based mobile payment method according to yet another exemplary embodiment.
Figure 6:
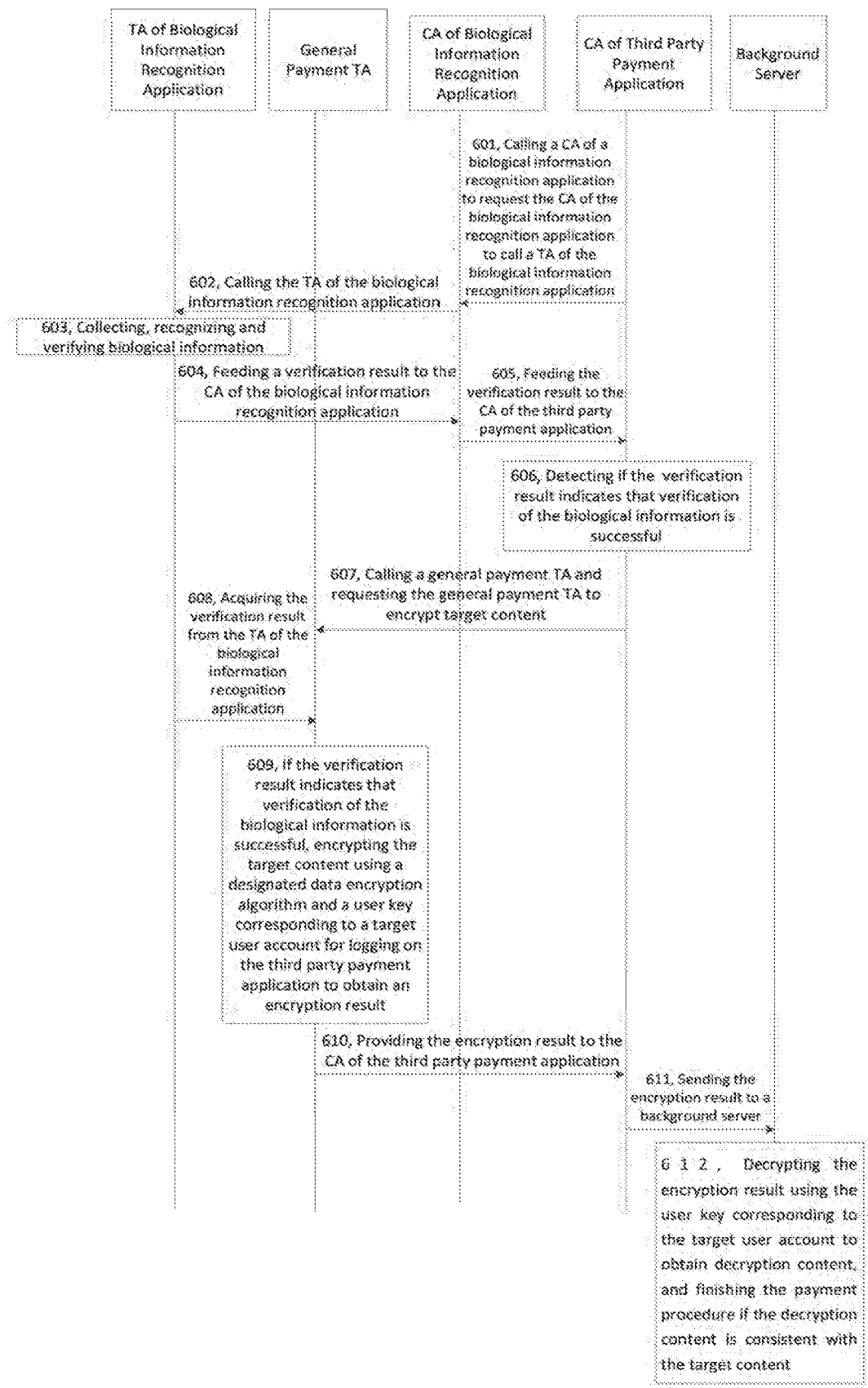
FIG. 6 is a flow chart showing a biological recognition technology-based mobile payment method to yet another exemplary embodiment.

The followings will describe the two method embodiments shown in FIGS. 5-6 from an activation procedure and a payment procedure.

In the embodiment shown in FIG. 5, an activation procedure of a target user account of a third party payment application is taken as an example. As showing FIG. 5, the activation procedure may comprise:

Step 501: calling a general payment TA by a CA of a third party payment application to request the general payment TA to generate an application key corresponding to the third party payment application.

The call request contains a first request parameter indicating a manner by which the general payment TA generates a key. According to the regulations of Java Cryptography Architecture (JCA), in a possible embodiment, the first request parameter includes a provider parameter, an alias parameter and an algorithm parameter. The provider parameter indicates calling of the general payment TA. The alias parameter indicates a manner of generating an application key, which may be an identification of the party payment application. In this case, the manner of generating a key can he determined based on the identification of the party payment application. The algorithm parameter indicates an algorithm used for generating a key.

Step 502: detecting by the general payment TA if an application key corresponding to the third party payment application has been stored if not, executing. Step 503; if yes, feeding information indicating that there is an application key back to the CA of the third party payment application.

Step 503: generating by the general payment TA the application key using a first key generation algorithm.

Step 504: encrypting by the general payment TA the application key using a first data encryption algorithm and a device key to obtain an encrypted application key.

Optionally, if the device key is an asymmetrical key, the general payment TA encrypts the application key using the first data encryption algorithm and a private key of the device key to obtain the encrypted application key.

Optionally, if the first data encryption algorithm is a digital signature algorithm, the general payment TA signs the application key using the digital signature algorithm and a key according to the device key to obtain the signature result of the application key.

Step 505: feeding by the general payment TA the encrypted application key back to the CA of the third party payment application.

Step 506: sending the encrypted application key by the CA of the third party payment application to a background server.

Step 507: storing the application key by the background server.

After receiving the encrypted application key from of the third party payment application, the background server using the device key, acquires and stores the decrypted application key.

Optional, if the device key is an asymmetrical key, the background server decrypts the application key using public key of the device key, acquires and stores the decrypted application key.

In addition, after the CA of the third party payment application receives the application key fed back by the general payment TA, Step 508 is executed.

Step 508: calling; the general payment TA by the CA of the third party payment application to request the general payment TA to generate a user key corresponding to a target user account.

The call request contains a second request parameter indicating a manner by which the general payment TA generates a user key. In a possible implementation, the second request parameter includes a provider parameter, an alias parameter and an algorithm parameter. The provider parameter indicates calling of the general payment TA. The alias parameter indicates a manner of generating a use key, which for example may be an identification of the third party payment application and the target user account. The algorithm parameter indicates an algorithm used for generating the user key.

Step 509: generating by the general payment TA the user key using a second key generation algorithm.

Step 510: encrypting by the general payment TA the user key using a second data encryption algorithm and the application key to obtain an encrypted user key.

Optionally, if the application key is an asymmetrical key, the general payment TA encrypts the user key using the second data encryption algorithm and, a private key of the application key to obtain the encrypted user key.

Optionally, if the second data encryption algorithm is a digital signature algorithm, the general payment TA signs the user key using the digital signature algorithm, and the application key to obtain a signature result of the user key.

Step 511: feeding by the general payment TA the encrypted user key hack to the CA of the third party payment application.

Step 512: sending the encrypted user key by the CA of the third party payment application to a background server.

Step 513: storing the user key b the background server.

After receiving the encrypted user key from the CA of the third party payment application, the background server decrypts the same using the application key, acquires and stores the user key.

Optionally, if the application key is an asymmetrical key, the background server decrypts the user key using a public key of the application key, acquires and stores the user key.

In the embodiment shown in FIG. 6, a payment procedure of a target user account of a third party payment application is taken as an example. As shown in FIG. 6, the payment procedure may comprise:

Step 601: calling a CA of a biological information recognition application by a CA of a third party payment application to request the CA of the biological information recognition application to call a TA of the biological information recognition application.

In the payment procedure, after requesting for and acquiring an order from a background server, the CA of the third party payment application calls the CA of the biological recognition application to request the same to call the TA, of the biological recognition application so as to initiate verification of biological information.

Step 602: calling the TA of the bio logical information recognition application by the CA of the biological information recognition application.

Step 603: collecting, recognizing and verifying biological information by the TA of the biological information recognition application.

Stop 604: feeding a biological information recognition result by the TA of the biological information recognition CA of the biological information recognition application.

Step 605; feeding the biological information result by the CA of the biological information recognition application to the CA of the third party payment application.

Step 606: detecting by the CA of the third party payment application if the biological information recognition result indicates that verification of the biological information is successful; if yes, executing Step 607; if not, ending the procedure.

Step 607: calling a general payment TA by the CA of the third payment application, and requesting the general payment TA to encrypt target content.

The target content is the content to be verified in the payment procedure and negotiated by the CA of the third party payment application and a background server. The call request contains a request parameter indicating a manner by h the general payment TA encrypts the target content. In a possible implementation, the request parameter includes a provider parameter, an alias parameter and an algorithm parameter. The provider parameter indicates calling of the general payment TA. The alias parameter may be an identification of the third party payment application and a target user account, and may be used as a key index indicating a user key used in the encryption The algorithm parameter indicates a data encryption algorithm used in the encryption.

Step 608: acquiring, the biological information recognition result From the TA of the biological information recognition application by the general payment TA.

Step 609: if the biological information recognition result indicates that verification of the biological information is successful, encrypting the target content by the general payment TA using a designated data encryption algorithm and a user key corresponding to a target user account for logging on the third party payment application to obtain an encryption result.

Optionally, if the user key is a asymmetrical key, the general payment TA encrypts the target content using a predetermined data encryption algorithm and a private key the user key to reobtain an encryption result.

Optionally if the data encryption algorithm is a digital signature algorithm, the general payment TA signs the target content using the digital signature algorithm and the user key to obtain a signature result.

Step 610: providing by the general payment TA the encryption result to the CA of the third party payment application.

Step 611: sending the encryption result by the CA of the third party payment application to a background server.

Step 612: decrypting the encryption result by the background server using the user key corresponding to the target user account to obtain decryption content, and finishing the payment procedure the decryption content is consistent with the target content.

Optionally, if the user key is an asymmetrical key, the background server decrypts the encryption result using a public key of the user key to obtain the decryption content.

An exemplary embodiment of this disclosure also provides a biological recognition technology-based mobile payment apparatus which can realize the mobile payment method provided by this disclosure. The apparatus comprise:

a biological information recognition application and a general payment Trusted Application (TA) operating in a Trusted Execution Environment (TEE);

the apparatus further comprising: a processor; and a memory storing an instruction executable by the processor, wherein the processor is configured to:

receive a call request from a third party payment application;

based on the call request, determine target content to be encrypted and an encryption parameter for performing encryption;

acquire a biological information recognition result from the biological information recognition application, encrypt the target content according to the encryption parameter and the biological information recognition result; and return an encryption result to the third party payment application, so that the third party payment application performs a payment-related operation based on the encryption result.

Figure 7:
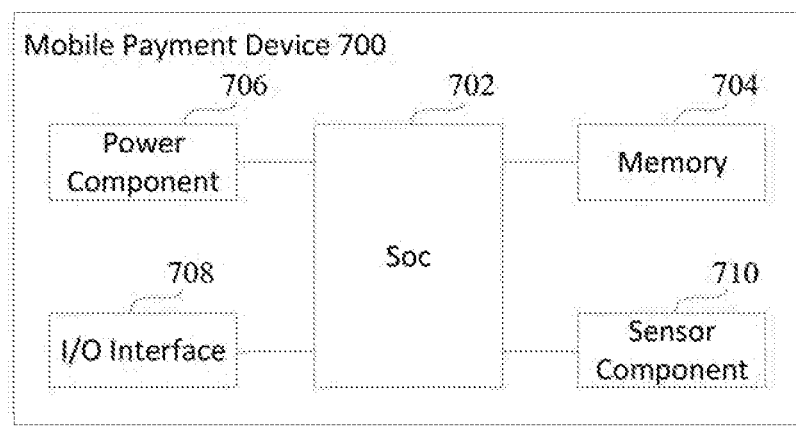
FIG. 7 is a block view showing a mobile payment device according to an exemplary embodiment.

FIG. 7 is a block view showing a mobile payment device 700 according to an exemplary embodiment. For example, the mobile payment device 700 may be a mobile phone, a tablet computer, a mobile PC, a personal digital assistant (PDA) or the like. As shown in FIG. 7, the mobile payment device 700 comprises: a System-on-a-Chi p (Sec) 702, a memory 704, a power component 706, an input/output (I/O) interface 708 and a sensor component 710.

The Soc 702 is the main processing component of the mobile payment device 700 and controls overall operations of the mobile payment device 700. In this embodiment, the Soc 702 includes a REE and a TEE. A CA of a biological information recognition application operates in the REE. A general payment TA and a TA of the biological information recognition application operate in the TEE. The general payment TA may be called by CAs of multiple third party payment applications, After the CA of the biological information recognition application is called by the CA of the third party payment application, the TA of the biological information recognition application is called. The TA of the biological information recognition application is used to collect, recognize and verify biological information. After the general payment IA is called by the CA of the third party payment application, the general payment TA determines target content to he encrypted and an encryption parameter for performing encryption based on the call request, acquires a biological information recognition result from the TA of the biological information recognition application; encrypts the target content according to the encryption parameter and the biological information recognition result; and returns an encryption result to the CA of the third party payment application, so that the CA of the third party payment application performs a payment-related operation based on the encryption result. The Soc 702 may include one or more processors to execute instructions to finish all or some of the steps of the above methods.

The memory 704 is configured to store various types of data to support the operation of the mobile payment device 700. Examples of such data include instructions for any applications or methods operated on the mobile payment device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a mad-only memory (ROM), a magnetic memory, a flash memory, a magnetic or optical disk.

The power component 706 provides power to various components of the mobile payment device 700. The power component 706 may include a power management system, one or more power sources, and any other components associated with the generation, management, and distribution of power in the mobile payment device 700.

The I/O interface 708 provides an interface between the Soc 702 and peripheral interface modules, such as a keyboard, a click wheel, buttons, and the like. The buttons may include, but not limited to, a home button, a volume button, a starting button, and a locking button.

The sensor component 710 includes more sensors to provide status assessments of various aspects of the mobile payment device 700. In this embodiment, the sensor component 710 at least includes a sensor of biological information. The biological information includes but is not limited to one or more of singe rims, rises, units, genes, voices, human faces, palm geometry, veins, gaits, handwriting. For instant, the sensor component 710 may includes a fingerprint sensor for collecting fingerprint information.

In exemplary embodiments, the mobile payment device 700 may further include one or more of a multimedia component, an audio component and a communication component.

In exemplary embodiments, the mobile payment device 700 may be implemented with one or more application specific integrated circuits (ASIC), digital signal processors (DSPs), digital signal processing devices (DSPDs),programmable logic devices (PLDs), field programmable gate arrays (FPGAs), controllers, micro-controllers, microprocessors, or other electronic components, for performing the above described methods.

In exemplary embodiments, there is also provided at non-transitory computer-readable storage medium including instructions, such as included in ti e memory 704. executable by the processor in t e mobile payment device 700, for performing the above-described methods. For example, computer-readable storage medium may be a ROM, a RAM, a CD-ROM, a tape, a floppy disk, an critical data storage device, and the like.

A non-transitory computer-readable storage medium is provided. When instructions stored in the storage medium are executed by the processor in the mobile payment device 700, the mobile payment device 700 can perform the above methods.

It is noted that the various modules, sub-modules, units and components in the present disclosure can be implemented using any suitable technology. In an example, a module can be implemented using such as integrated circuit (IC). In an another example, a module can be implemented as a processing circuit executing software instructions.

Other embodiments of the invention will be apparent to those skilled in the art from consideration of the specification and practice of the invention disclosed here. This application is intended to cover any variations, uses, or adaptations of the invention following the general principles thereof and including departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited b the appended claims.

The invention claimed is:

1. A method for performing biometrics based payment, comprising:
   receiving, by a payment Trusted Application (TA) that is executed by processing circuitry and that operates in a Trusted Execution Environment (TEE) on a device, a call request from one of a plurality of third party payment applications that are installed on the device and operate with the payment TA, wherein the payment TA is associated and configured to operate only with payment-related operations and with the plurality of third party payment applications installed on the device;
   managing, by the payment TA via the processing circuitry, an algorithm that comprises at least one key generation algorithm and at least one data encryption algorithm;
   generating, by the payment TA via the processing circuitry, a key required for performing payment-related operation by using the key generation algorithm;
   acquiring, by the payment TA via the processing circuitry, a result of biometric recognition from a biometric recognition application;
   storing, by the payment TA via the processing circuitry, the generated key;
   determining, by the payment TA via the processing circuitry, content to be encrypted and an encryption parameter for performing encryption based on the call request;
   encrypting, by the payment TA via the processing circuitry, the content according to the encryption parameter and the result of biometric recognition; returning, by the payment TA via the processing circuitry, the encrypted content to the third party payment application that generates the call request, for the third party payment application to perform a payment-related operation based on the encrypted content;
   detecting, by the payment TA via the processing circuitry, whether an application key corresponding to the third party payment application exists in the payment TA at a time to activate the third party payment application for a biometric recognition based payment function;
   determining, by the payment TA via the processing circuitry, a first key generation algorithm, a first data encryption algorithm, a second key generation algorithm and a second data encryption algorithm based on the call request when no application key corresponding to the third party payment application exists in the payment TA;
   generating, by the payment TA via the processing circuitry, the application key for the third party payment application using the first key generation algorithm;
   encrypting, by the payment TA via the processing circuitry, the application key using the first data encryption algorithm and a device key of the device;
   generating, by the payment TA via the processing circuitry, a user key corresponding to a user account using the second key generation algorithm;
   encrypting, by the payment TA via the processing circuitry, the user key using the second data encryption algorithm and the application key;
   returning, by the payment TA via the processing circuitry, the encrypted application key and the encrypted user key to the third party payment application for the third party payment application to provide the encrypted application key and the encrypted user key to a sever;
   detecting, by the payment TA via the processing circuitry, whether an application key corresponding to the third party payment application exists in the payment TA at a time to activate the third party payment application for a biometric recognition based payment function;
   determining, by the payment TA via the processing circuitry, a key generation algorithm and a data encryption algorithm based on the call request when the application key corresponding to the third party payment application exists in the payment TA;
   generating, by the payment TA via the processing circuitry, a user key corresponding to a user account using the key generation algorithm;
   encrypting, by the payment TA via the processing circuitry, the user key using the data encryption algorithm and the application key; and
   returning, by the payment TA via the processing circuitry, the encrypted user key to the third party payment application for the third party payment application to provide the encrypted user key to a server,
   wherein the biometric recognition application receives the call request from the third party payment application, collects, recognizes and verifies biometrics to obtain the result of biometric recognition, and sends the result of biometric recognition to the third party payment application; and when the result of biometric recognition indicates that verification of biometrics is successful, the third party payment application sends the call request to the payment TA.

2. The method according to claim 1, wherein encrypting the content according to the encryption parameter and the result of biometric recognition comprises:
   detecting, by the payment TA via the processing circuitry, whether the result of biometric recognition indicates a success of biometric verification when the third party payment application performs a payment operation for a user account;
   encrypting, by the payment TA via the processing circuitry, the content using the encryption parameter and a user key corresponding to the user account to obtain an encryption result; and returning, by the payment TA via the processing circuitry, the encryption result to the third party payment application for the third party payment application to provide the encryption result to a server.

3. The method according to claim 1, wherein the third party payment application is a Client Application (CA) operating in a Rich Execution Environment (REE) in the device.

4. An apparatus, comprising:
a processor; and
a memory storing instructions executable by the processor,
wherein the processor is configured to:
- execute a payment Trusted Application (TA) that operates in a Trusted Execution Environment (TEE) on a device;
- receive, by the payment TA, a call request from one of a plurality of third party payment applications that are installed on the device and operate with the payment TA, wherein the payment TA is associated and configured to operate only with payment-related operations and with the plurality of third party payment applications installed on the device;
- manage, by the payment TA, an algorithm that comprises at least one key generation algorithm and at least one data encryption algorithm;
- generate, by the payment TA, a key required for performing payment-related operation by using the key generation algorithm;
- acquire, by the payment TA, a result of biometric recognition from the biometric recognition application;
- store, by the payment TA, the generated key in the memory, determine, by the payment TA, content to be encrypted and an encryption parameter for performing encryption based on the call request;
- encrypt, by the payment TA, the content according to the encryption parameter and the result of biometric recognition;
- return, by the payment TA, the encrypted content to the third party payment application that generates the call request, for the third party payment application to perform a payment-related operation based on the encrypted content;
- detect, by the payment TA, whether an application key corresponding to the third party payment application exists in the payment TA at a time to activate the third party payment application for a biometric recognition based payment function;
- determine, by the payment TA, a first key generation algorithm, a first data encryption algorithm, a second key generation algorithm and a second data encryption algorithm based on the call request when no application key corresponding to the third party payment application exists in the payment TA;
- generate, by the payment TA, the application key for the third party payment application using the first key generation algorithm;
- encrypt, by the payment TA, the application key using the first data encryption algorithm and a device key of the apparatus;
- generate, by the payment TA, a user key corresponding to a user account using the second key generation algorithm;
- encrypt, by the payment TA, the user key using the second data encryption algorithm and the application key;
- return, by the payment TA, the encrypted application key and the encrypted user key to the third party payment application for the third party payment application to provide the encrypted application key and the encrypted user key to a server;
- detect, by the payment TA, whether an application key corresponding to the third party payment application exists in the payment TA at a time to activate the third party payment application for a biometric recognition based payment function;
- determine, by the payment TA, a key generation algorithm and a data encryption algorithm based on the call request when the application key corresponding to the third party payment application exists in the payment TA;
- generate, by the payment TA, a user key corresponding to a user account using the key generation algorithm;
- encrypt, by the payment TA, the user key using the data encryption algorithm and the application key; and
- return, by the payment TA, the encrypted user key to the third party payment application for the third party payment application to provide the encrypted user key to a server,
wherein the biometric recognition application receives the call request from the third party payment application, collects, recognizes and verifies biometrics to obtain the result of biometric recognition, and sends the result of biometric recognition to the third party payment application; and when the result of biometric recognition indicates that verification of biometrics is successful, the third party payment application sends the call request to the payment TA.

5. The apparatus according to claim 4, wherein the processor is configured to:
- detect, by the payment TA, whether the result of biometric recognition indicates a success of biometric verification when the third party payment application performs a payment operation for a user account;
- encrypt, by the payment TA, the content using the encryption parameter and a user key corresponding to the user account to obtain an encryption result; and
- return, by the payment TA, the encryption result to the third party payment application for the third party payment application to provide the encryption result to a server.

6. The apparatus according to claim 4, wherein the third party payment application is a Client Application (CA) operating in a Rich Execution Environment (REE) of the apparatus.

7. A non-transitory computer-readable storage medium having stored therein instructions that, when executed by a processor of a device, causes the device to perform operations for biometric recognition based payment, the operations comprising:
- receiving, by a payment Trusted Application (TA) that operates in a Trusted Execution Environment (TEE) on the device, a call request from one of a plurality of third party payment applications that are installed on the device and operate with the payment TA, wherein the payment TA is associated and configured to operate only with payment-related operations and with the plurality of third party payment applications installed on the device;
- managing, by the payment TA, an algorithm that comprises at least one key generation algorithm and at least one data encryption algorithm;
- generating, by the payment TA, a key required for performing payment-related operation by using the key generation algorithm;

acquiring, by the payment TA, a result of biometric recognition from a biometric recognition application;

storing, by the payment TA, the generated key;

determining, by the payment TA, content to be encrypted and an encryption parameter for performing encryption based on the call request;

encrypting, by the payment TA, the content according to the encryption parameter and the result of biometric recognition;

returning, by the payment TA, the encrypted content to the third party payment application that generates the call request, for the third party payment application to perform a payment-related operation based on the encrypted content;

detecting, by the payment TA, whether an application key corresponding to the third party payment application exists in the payment TA at a time to activate the third party payment application for a biometric recognition based payment function;

determining, by the payment TA, a first key generation algorithm, a first data encryption algorithm, a second key generation algorithm and a second data encryption algorithm based on the call request when no application key corresponding to the third party payment application exists in the payment TA;

generating, by the payment TA, the application key for the third party payment application using the first key generation algorithm;

encrypting, by the payment TA, the application key using the first data encryption algorithm and a device key of the mobile terminal device;

generating, by the payment TA, a user key corresponding to a user account using the second key generation algorithm;

encrypting, by the payment TA, the user key using the second data encryption algorithm and the application key;

returning, by the payment TA, the encrypted application key and the encrypted user key to the third party payment application for the third party payment application to provide the encrypted application key and the encrypted user key to a sever;

detecting, by the payment TA, whether an application key corresponding to the third party payment application exists in the payment TA at a time to activate the third party payment application for a biometric recognition based payment function;

determining, by the payment TA, a key generation algorithm and a data encryption algorithm based on the call request when the application key corresponding to the third party payment application exists in the payment TA;

generating, by the payment TA, a user key corresponding to a user account using the key generation algorithm;

encrypting, by the payment TA, the user key using the data encryption algorithm and the application key; and returning, by the payment TA, the encrypted user key to the third party payment application for the third party payment application to provide the encrypted user key to a server;

wherein the biometric recognition application receives the call request from the third party payment application, collects, recognizes and verifies biometrics to obtain the result of biometric recognition, and sends the result of biometric recognition to the third party payment application; and when the result of biometric recognition indicates that verification of biometrics is successful, the third party payment application sends the call request to the payment TA.

8. The non-transitory computer-readable storage medium according to claim 7, wherein the operation of encrypting the content according to the encryption parameter and the result of biometric recognition comprises:

detecting, by the payment TA, whether the result of biometric recognition indicates a success of biometrics verification when the third party payment application performs a payment operation for a user account;

encrypting, by the payment TA, the content using the encryption parameter and a user key corresponding to the user account to obtain an encryption result; and returning, by the payment TA, the encryption result to the third party payment application for the third party payment application to provide the encryption result to a server.

* * * * *